United States Patent
Huang

(10) Patent No.: US 10,776,815 B1
(45) Date of Patent: *Sep. 15, 2020

(54) PREDICTING ADVERTISEMENT IMPACT FOR CAMPAIGN SELECTION

(71) Applicant: Quantcast Corporation, San Francisco, CA (US)

(72) Inventor: Tianxiao Huang, San Francisco, CA (US)

(73) Assignee: Quantcast Corporation, San Francisco, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/002,436

(22) Filed: Jun. 7, 2018

Related U.S. Application Data

(63) Continuation of application No. 14/562,988, filed on Dec. 8, 2014, now Pat. No. 10,019,728.

(51) Int. Cl.
  *G06Q 30/00* (2012.01)
  *G06Q 30/02* (2012.01)

(52) U.S. Cl.
  CPC ..... *G06Q 30/0243* (2013.01); *G06Q 30/0273* (2013.01)

(58) Field of Classification Search
  None
  See application file for complete search history.

(56) References Cited

U.S. PATENT DOCUMENTS

| | | | | |
|---|---|---|---|---|
| 8,571,930 B1 * | 10/2013 | Galperin | ............ | G06Q 30/0273 705/14.43 |
| 8,667,135 B1 * | 3/2014 | Sutter | ................ | H04N 21/2402 705/14.51 |

(Continued)

FOREIGN PATENT DOCUMENTS

| | | | | |
|---|---|---|---|---|
| EP | 1244036 | | 9/2002 | |
| EP | 1244036 A1 | * | 9/2002 | ............ G06Q 10/04 |

(Continued)

OTHER PUBLICATIONS

BLUEWOLF. Align Sales and Marketing by Tracking Campaign Influence in Salesforce. (Sep. 18, 2014). Retrieved online Feb. 28, 2018. https://www.bluewolf.com/bluewolf-now/align-sales-and-marketing-tracking-campaign-influence-salesforce. (Year: 2014).*

(Continued)

*Primary Examiner* — James A Reagan
(74) *Attorney, Agent, or Firm* — Robin W. Reasoner; Andrea Wheeler

(57) ABSTRACT

An influence system for predicting advertisement impact for campaign selection. For each campaign, an advertising probe campaign is operated by sending an advertisement to each entity in a treatment group of entities. A control group of entities which excludes the treatment group entities is selected and no campaign advertising content is sent to the treatment group entities. An influence model is created for each campaign by comparing features of the respective advertising probe campaign's treatment group converters to features of the control group converters. A campaign is selected for an opportunity to expose a specified entity to advertising based on the result of applying each respective campaign's influence model to features of the specified entity. Advantageously, a campaign operator can make good use of a rare, high quality advertising opportunity by allotting it to an advertising campaign based on a likelihood of influencing the specified entity.

20 Claims, 5 Drawing Sheets

(56) References Cited

U.S. PATENT DOCUMENTS

| | | | | |
|---|---|---|---|---|
| 8,688,517 | B2* | 4/2014 | Lutnick | G06Q 30/02 |
| | | | | 705/14.4 |
| 10,019,728 | B1* | 7/2018 | Huang | G06Q 30/0243 |
| 2010/0217662 | A1* | 8/2010 | Ramer | G06F 16/9535 |
| | | | | 705/14.42 |
| 2014/0310058 | A1* | 10/2014 | Aral | G06Q 50/01 |
| | | | | 705/7.29 |
| 2015/0332341 | A1* | 11/2015 | Gadoury | G06Q 30/0251 |
| | | | | 705/14.66 |

FOREIGN PATENT DOCUMENTS

| | | | | |
|---|---|---|---|---|
| WO | WO-2010034311 A1 * | 4/2010 | | G06Q 30/02 |
| WO | WO-2010109337 A2 * | 9/2010 | | G06Q 30/0242 |

OTHER PUBLICATIONS

Yakuel, Pini. How to Treat Every Customer Campaign as a Marketing Experiment. (Apr. 17, 2013). Retrieved online Apr. 21, 2020. https://www.optimove.com/blog/treat-every-customer-campaign-as-a-marketing-experiment (Year: 2013).*

McWilliams et al. An expanded framework for measuring the effectiveness of destination advertising. (1997). Retrieved online Apr. 21, 2020. http://agrilifecdn.tamu.edu/cromptonrpts/files/2011/06/Full-Text69.pdf (Year: 1997).*

Bluewolf Now, "Align Sales and Marketing by Tracking Campaign Influence in Salesforce," Sep. 18, 2014, Retrieved online Feb. 28, 2018 from the internet <URL: https://www.bluewolf.com/bluewolf-now/align-sales-and-marketing-tracking-- campaign-influence-salesforce.>.

* cited by examiner

300

An advertising probe campaign is operated (Step 310).

A set of treatment group converters is selected (Step 320).

A set of control group converters is selected (Step 330).

An influence model is constructed by comparing features of the treatment group converters to features of the control group converters (Step 340).

An advertising campaign is operated (Step 350).

FIG. 3

PREDICTING ADVERTISEMENT IMPACT FOR CAMPAIGN SELECTION

CROSS-REFERENCE TO RELATED APPLICATIONS

This application is a continuation of U.S. Non-Provisional application Ser. No. 14/562,988 entitled Predicting Advertisement Impact for Campaign Selection by Tianxiao Huang, filed on Dec. 8, 2014, which is hereby incorporated by reference in its entirety.

BACKGROUND

1. Technical Field

The invention relates to selecting entities to receive online advertising.

2. Description of Related Art

Information collected during Internet browsing has traditionally been used to select entities for the delivery of online advertising. Behavioral models can be built to assess the suitability of an entity for receiving an advertisement based on the entity's inferred similarity to a converter or target audience. Based on the results of applying the behavioral model to an entity's history, a campaign operator can infer the likelihood that an entity will convert. A measure of the likelihood of conversion can be used to make decisions such as how much to bid on a Real Time Bidding (RTB) Exchange for an opportunity to expose the entity to advertising, how to customize advertising content or both. However, the likelihood than entity will convert is not the same as the likelihood that the entity can be influenced by an advertisement. In other words, some customers may be influenced by an advertising exposure and convert due, at least in part, to the advertising exposure. This kind of desirable advertising exposure moves the customer towards conversion. In contrast, a customer who already intends to purchase an advertiser's goods may not be moved towards closer to conversion by advertising exposures shown while the customer is on the way to making that purchase. This may be because the customer already intends to make a purchase. Ideally, an advertiser would like to avoid sending advertisements to a customer who is already convinced to purchase that advertiser's product to prevent over-exposure which could deter the customer from making a purchase.

Frequency caps may be specified for a campaign to prevent over-exposure. For example, a campaign specification may limit the number of times any entity may be shown an ad with a frequency cap (e.g. "no more than 5 advertisement exposures to the same browser in a 24 hour period"). However, such a frequency cap does not take into account the likelihood that an advertisement will influence an individual customer.

What is needed is a way to select the audience of potential customers which are most likely to be positively influenced by an advertisement for an advertising campaign and avoid sending advertisements to customers which may be negatively influenced by an advertisement.

SUMMARY

Embodiments of the invention provide a system, method, and computer-readable medium which leverage the results of comparative testing to create an influence model. The influence model is created by comparing the features of entities of a treatment group which were exposed to an advertisement and converted to the features of entities of a control group which were not exposed to the advertisement but converted anyways. By applying the influence model to an entity's features, the likelihood that the entity may be influenced by an advertisement can be estimated. The likelihood that an entity may be influenced by an advertisement may be used to set an individual frequency cap for the entity, add the entity to a targeting blacklist (or whitelist), add the entity to an attribution blacklist (or whitelist), configure a bid response to an online advertising exchange, customize advertising content, set a bid price for an opportunity to expose the entity to advertising content, select an advertising campaign for the entity or combinations thereof.

In an embodiment, in addition to an influence model, the influence system may create a conversion model which predicts the likelihood of conversion of an entity. The conversion model is created by comparing the features of entities which converted to the features of a standard audience, such as entities which did not convert. The likelihood of conversion of an entity may be estimated by applying the conversion model to the features of an entity, such as an entity's media consumption history. The likelihood that the same entity may be influenced can be estimated by applying the influence model to the entity's media consumption history. By taking into account both the likelihood of conversion and the likelihood that an entity may be influenced, the influence system can select the entities which are both most likely to convert and most likely to be influenced by an advertisement to receive advertisements. The results of applying the conversion model and the influence model to an entity's features may be used to add the entity to a targeting blacklist, add the entity to an attribution blacklist, set an individual frequency cap for the entity, customize advertising content, configure a bid response to an online advertising exchange, set a bid price for an opportunity to expose the entity to advertising content, select an advertising campaign or combinations thereof.

In an embodiment, features of an entity may be found in, derived from or inferred from a history, such as a media consumption history. Features used to create an influence model may be selected from the histories. For example, an influence model may be applied to a specified entity's history to estimate the likelihood that an advertisement will influence the specified entity.

In an embodiment, multiple campaign-specific influence models may be generated. A campaign operator which operates campaigns on behalf of multiple campaigns may match a campaign with an opportunity to expose a specified entity to advertising content based at least in part on the results of applying the campaign-specific influence models to the specified entity's features. Ideally, a campaign operator can make good use of a rare, high quality advertising opportunity by allotting it to an advertising campaign with a high likelihood of influencing the target entity.

In an embodiment the influence system, the influence system executes a comparative test, such as an AB test, by operating an advertising probe campaign. In an embodiment, an advertising probe campaign purchases suitable advertising exposures through a real time bidding exchange (RTB). A treatment group of the entities comprises suitable entities which were exposed to advertising content; a control group of entities comprises suitable entities which were not exposed to advertising content. The treatment group and the control group are disjoint.

Advantageously, the influence system can help an advertiser focus their advertising budget and reduce spending on sending advertisements to entities which are unlikely to be influenced by an advertisement or to entities which may be negatively influenced by an advertisement.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIG. 3 is a flow chart illustrating an example of a method of constructing an influence model according to an embodiment.

DETAILED DESCRIPTION

Figure 1:
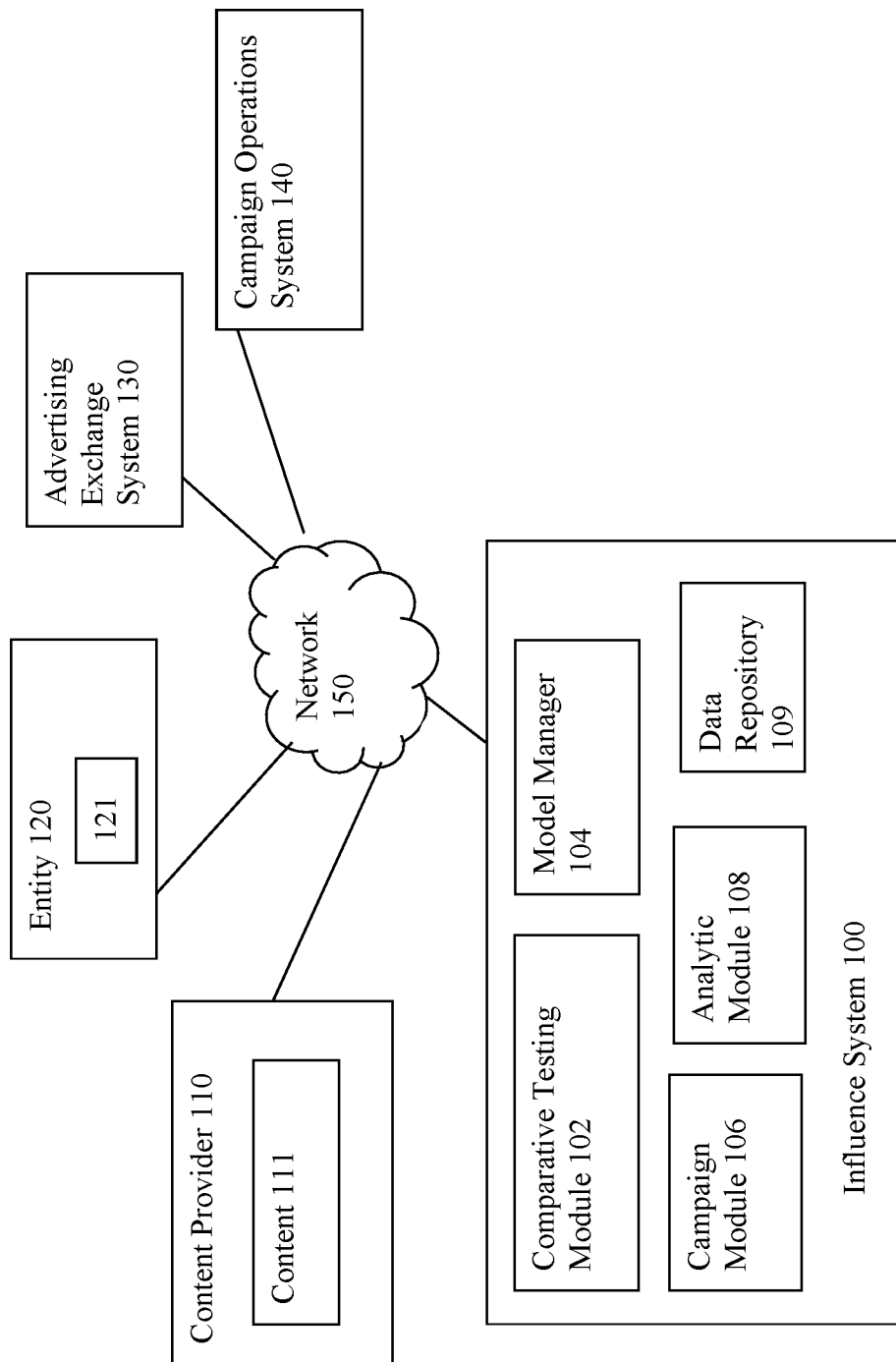
FIG. 1 illustrates an example computing environment in accordance with an embodiment of the invention.

FIG. 1 illustrates an example computing environment in accordance with an embodiment of the invention. In particular, the influence system 100 operates a comparative test, such as an AB test, and leverages the results of the comparative testing to generate an influence model. The influence model predicts the likelihood that an advertising exposure to a specified entity will influence the specified entity towards conversion. The influence system creates the influence model by comparing the features of treatment group converters (entities which were exposed to an advertisement and converted) to the features of control group converters (entities of a control group which were not exposed to the advertisement but converted anyways). The ability to predict the likelihood that an entity may be influenced by an advertisement may be used to improve the effectiveness of an advertising campaigns; for example, the influence model may be used to set an individual frequency cap for an entity, add an entity to a targeting blacklist (or whitelist), add an entity to an attribution blacklist (or whitelist), configure a bid response to an online advertising exchange, customize advertising content, set a bid price for an opportunity to expose an entity to advertising content, select an advertising campaign or combinations thereof. An influence model may be most accurate when predicting the likelihood that an entity may be influenced by advertising content that is identical to the advertising content used in the comparative test. However, the influence model is still expected to have predictive value when the advertising content delivered during the operation of an advertising campaign differs from the advertising content used in the comparative test.

FIG. 1 illustrates an example computing environment in accordance with an embodiment of the invention. As shown in FIG. 1, the influence system 100, a content provider 110, an entity 120, an advertising exchange system 130 and a campaign operations system 140. These elements are connected by a communications network 150, such as a local area network, a wide area network, a wireless network, an intranet, a cable network, a satellite network, a cellular phone network, an optical network, the Internet or combinations thereof.

Content provider 110 sells opportunities to expose entities to advertising content. The opportunities may be sold directly by the content provider, through an advertising network or exchange (such as an RTB exchange) or combinations thereof. A content provider such as a website operator may provide media such as website content to a visitor and sell the opportunity to expose their visitors to advertising content. A content provider may make services such as mapping services available to a mobile device operator and sell the opportunity to expose the mobile device operator to advertising content in conjunction with their services. A content provider may provide downloadable software, such as a mobile phone application, and sell the opportunity to expose the operator of the downloadable software with advertising content in conjunction with the delivery of the downloadable software, the operation of the downloadable software or both.

Advertising content is delivered over the communications network 150 to an entity. For example, an entity can be a visitor to the media available through the content provider, a user of services available through the content provider, an entity which downloads software available through the content provider, a mobile application operator or combinations thereof. Examples of content providers 110 can include web site operators, cable television operators, online service vendors, mobile application vendors and mobile application service providers. Examples of advertising content can include, but are not limited to advertising content embedded in a web page, advertising content provided in conjunction with a web page (i.e. a banner ad, a pop-over ad, a pop-under ad), an online video clip, an advertisement embedded in a cable television program, an advertisement provided via a mobile application, an audio clip, an advertisement provided in conjunction with the results of a keyword search from an online search engine or an advertisement provided in conjunction with the results of a request for directions from an online mapping service. In some examples, advertising content can be provided over the communications network 150, based on a request to content provider 110; in some examples, content provider 110 or a content provider's proxy can push advertising content over the communications network 150 to an entity 120. Although only one content provider 110 is shown in FIG. 1 for clarity, multiple content providers may be connected to the communications network 150.

In various embodiments, an entity 120, accesses content 111 from a content provider 110 over the communications network 150. Examples of entities can include end-users, consumers, customers, software installations or hardware devices used to access content or combinations thereof. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. A consumer is a person or group of people who access content. In some cases, an entity can comprise a combination of entities which are logically grouped together to represent individuals, households or groups of individuals who access content 111 over a communications network 150. An entity which receives content 111, such as a web page, from a content provider 110, such as a website, can also be called a visitor to content provider 110. In an example, an entity can receive content 111, such as software downloaded over the network 150, from a content provider 110, such as a mobile applications or mobile services provider. In an example, an entity can access services provided by a content provider 110 over a network 150.

In some examples according to the current invention, an entity may represent an individual person. However, in some cases, an entity may represent a user, a web site visitor, a registered user, a licensed seat and/or a logical agglomerative grouping or subset thereof such as, but not limited to, a business, a family, household, social network, team and/or department.

As shown in the embodiment of FIG. 1, an entity can store a variable value. For example, an entity can locally store a software variable value such as a cookie value. An operating system installed on a mobile device can store an operating system variable locally on a mobile device. In some cases, an entity can store multiple variable values, such as multiple first party cookies, multiple third party cookies or combinations thereof. In some cases, a cookie value with a unique value can be used to identify the entity to various systems; a unique cookie value may or may not comprise personally identifiable information (PII) such as a person's name or street address.

In some cases, the influence system 100 may be permitted to maintain individual histories per entity 120 or access systems which maintain individual histories per entity. For example, entity 120 may have agreed to allow a system, such as influence system 100 or a direct measurement system, to maintain a history, such as a media consumption history. In some cases, in exchange for permission to maintain an individual history per entity, an entity 120 may receive compensation, such as the ability to access networked resources, discounted goods, discounted services, money, or combinations thereof. Although only one entity 120 is shown in FIG. 1 for clarity, multiple entities may be connected to the communications network 150.

Entities may differ with respect to their privacy preferences, and certain entities may consent to having more information maintained at an influence system 100 them than other entities. Additionally, each data partner typically establishes limitations which govern the acceptable use of information provided by the data partner. The system may filter or restrict the usage of information provided by data partners in order to meet contractual obligations or legal obligations defined according to the laws of a jurisdiction of importance, such as the State of California, the United States, or the European Union, for example.

A content provider 110 may be integrated with a direct measurement system which can collect information for an entity, such as entity 120, in conjunction with an identifier, such as entity identifier 121. For example, when entity 120 requests content 111 from a content provider 110, such as a request from a web browser operating on a personal computer to display the content of a web page of an online publisher, the content provider 110 can re-direct the entity 120 to submit a pixel request to the direct measurement system. Based on the pixel request, and optional subsequent actions, the direct measurement system can collect information from the entity 120 and information associated with the entity 120. In an example, the information may comprise a referral string comprising query terms submitted to an online search engine to locate an item of content. Information is collected in conjunction with an identifier, such as entity identifier 121, in order to enable the maintenance of a coherent body of information, such histories which document measurable events such as the consumption of content, for an entity over time. In some cases, an influence system 100 may comprise an internal direct measurement system. In some cases, an influence system 100 may be integrated with one or more external direct measurement systems.

A content provider which is a mobile application vendor or a mobile application service provider may provide content to an entity. For example, a content provider may provide software to a mobile phone. In an example, a mobile application can be integrated with measurement instructions in the form of a software developers kit (SDK) which enables the mobile application to collect information about a mobile device, a mobile application or both. The SDK may enable a mobile device to collect information which can be used to assess advertisement viewability. Furthermore, the SDK includes methods for sending an event notification comprising information to a system over a network 150 such as, but not limited to, a direct measurement system and influence system 100; this information may become part of an entity's history.

Information can include a consumption history for an entity, such as records of the execution of measurable events and attribute values. In some cases, the context of an event, such as the duration and quality of a consumption event, can be provided to the influence system and may become part of a history accessible by the influence system 100. In an example, information associated with the hardware configuration, software configuration or volume settings during the delivery of an audio advertisement can be provided to the influence system as part of an event notification. In some cases, information describing interactions with content, such as pausing an online video clip or scoring points in a game operating on a mobile phone, may be provided to a system such as an influence system, a direct measurement system or both. In some cases, the SDK may enable a mobile device to assess advertisement viewability; viewability ratings, scores or combinations thereof may be sent to a system such as a direct measurement system, an influence system or both, and this information may become part of an entity's history.

An advertising exchange, such as advertising exchange system 130, is an electronic marketplace for buying and selling advertising impressions, such as the opportunity to expose a specified entity to advertising content delivered over a network. In an example, a real time bidding (RTB) advertising exchange can support the rapid auction of advertising impressions as they become available. For example, the advertising exchange system 130 can be notified by a content provider 110 after an entity 120, requests content 111 from the content provider 110 and an opportunity to display an advertising impression to that entity becomes available.

The advertising exchange system 130 can provide bid requests, such as a stream of bid requests, to a campaign operations system 140, with each bid request describing the opportunity to expose a specified entity to advertising content which is available for bidding. A bid request can comprise a request for a bid price. For example, the advertising exchange may provide features in a bid request which describe the advertising impression, such as the size of the advertisement, the position of the advertising impression with respect to a web page, the web site location of the advertising impression, the context or topic of the display webpage associated with the advertising impression. The specified entity which is the intended recipient of the advertising impression may be described in the bid request with features, such as the local time of day for that entity and an identifier. A unique cookie value is an example of an identifier that may be sent by the advertising exchange. Some information which is provided in the bid request may be provided to the advertising exchange system from the content provider. Some advertising exchange systems enable auction participants to set or retrieve one or more variables, such as a browser cookie value, with the specified entity. The influence system 100 or the campaign operations system 140 can use this feature to set and retrieve a unique variable value such as an identifier, a non-unique variable value such as a group identifier, or combinations thereof. Each advertising exchange typically establishes limitations which govern the acceptable use of information included in a bid request. The influence system 100 may filter or restrict the usage of information included in a bid request in order to meet contractual obligations.

An advertising exchange system 130 receives bid responses related to a bid request, which can include a bid price, selects the winning bid and enables the winning bidder's advertising content to be sent to an entity. In some cases, an advertising server system (not shown) may be integrated into the process, and the advertising content may be served to an entity by the advertising server system on behalf of the winning bidder. For example, an advertising server system can comprise a web server for storing online advertising content and delivering the online advertising content to entities, such as website visitors, through a client device. A local advertising server system may only provide services for a single content provider, whereas third-party advertising server systems can provide services in conjunction with multiple content providers.

A campaign operations system 140 operates an advertising campaign on behalf of an advertiser. A demand side platform (DSP) is an example of a campaign operator that can operate multiple advertising campaigns on behalf of multiple advertisers. In an example, a campaign operations system 140 can be integrated with one or more advertising exchange systems 130, and receive one or more streams of bid requests. The campaign operations system 140 can assess features of a bid request to determine the suitability of the opportunity to expose a specified entity to advertising content for an advertising campaign. In some cases, assessing the suitability of an opportunity can comprise assessing an opportunity with respect to an advertising campaign to reflect a likelihood of conversion by categorizing, scoring or rating the opportunity, the specified entity associated with the opportunity or both. In various embodiments, a campaign operations system 140 can take a subsequent action which may be based on the features of the bid request such as, but not limited to: configuring a bid response, sending a bid response to an advertising exchange system 130, customizing an advertising creative, selecting advertising content, selecting a bid price, selecting a campaign which best suits the opportunity, setting an individual frequency cap for the specified entity or combinations thereof.

An advertising exposure results from the delivery of advertising content over a network 150 to an entity. Advertising exposures can comprise content such as textual content, graphical content, video content, audio content or multi-media content which may be embedded in or delivered in conjunction with web pages, networked game displays, mobile application interfaces, multi-media presentations, video content, audio content or combinations thereof. An advertising exposure can be a simple exposure which does not require or enable end-user interaction. Some examples of advertising exposures can enable end-user interaction, such as an online advertisement which allows an end-user to click-through to the advertiser's web page or an in-game advertisement which allows an end-user to submit a vote in an opinion survey; similarly, an advertising exposure such as a paid search result can enable end-user interaction, such as a click-through to an advertiser's website.

A conversion is an action deemed desirable by the advertiser, such as buying an advertised product, visiting a website, completing a registration, signing up for a service, etc. In some cases, the influence system may be notified by an external system of entities which have met conversion criterion. For example, a list of converters comprising one or more entity identifiers may be sent to the influence system 100 from an external resource (not shown). In another example, the influence system may be provided with one or more conversion criteria for a particular advertising campaign and be able to select entities which are converters by examining entity histories to determine if any of the entities have meet the one or more conversion criteria.

In an embodiment, influence system 100 comprises a comparative testing module 102, a model manager 104, a campaign module 106, an analytic module 108 and a data repository 109. In an embodiment, influence system 100 may further comprise a campaign operations system such as campaign operations system 140; for example, campaign module 106 may comprise a campaign operations system such as campaign operations system 140.

A comparative testing module 102 executes comparative tests, such as AB tests, bucket tests or split tests. As a result of the execution of a comparative test, at least one set of entities (a treatment group) are exposed to an advertising treatment and a control set of entities (a control group) are not exposed to the advertising treatment. The treatment group and the control group are disjoint. In other words, there are no entities which are included in both the treatment group and the control group. In a successful comparative test, at least some entities of the treatment set will meet a conversion criterion after exposure to the advertising treatment; these entities may be called "treatment group converters". Ideally, at least some entities of the control set will meet the conversion criterion; these entities may be called "control group converters".

In comparative testing, the treatment group receives an advertising treatment. An advertising treatment comprises advertising content, such as an advertising creative, which is sent to an entity over a network. Advertising content can comprise an image, text, a video clip, an audio clip, a multimedia presentation, or combinations thereof.

In contrast to the treatment group, the control group does not receive the advertising treatment sent to the treatment group. Instead, the control group may receive a null treatment (e.g. no advertising content appears in a slot for the advertisement), a public service announcement (PSA) or content unrelated to the advertising campaign. There are no entities of the control group which are also included in the treatment group.

Comparative testing module 102 may reduce comparative testing bias through careful composition of the control group and the treatment group. For example, an entity may be randomly assigned to the control group or the treatment group based on a random numbers.

In an embodiment, the comparative testing module 102 can operate an advertising probe campaign with the opportunity to expose an entity to an advertisement acquired through one or more venues such as, but not limited to, an auction or exchange system such as advertising exchange system 130, a contractual agreement with a publisher, a contractual agreement with a network of publishers or combinations thereof. For example, the opportunity to expose an entity to advertising content may be purchased through an advertising exchange system 130 on behalf of an advertiser. Influence system 100 may receive a stream of bid requests. In an example, the bid requests which are most suitable for the advertising probe campaign may be selected and the influence system 100 may send a bid response to the advertising exchange system. In some examples, the bid response comprises a bid price, an advertising creative, instructions for locating an advertising creative, instructions for generating or customizing an advertising creative or combinations thereof; this enables the advertising exchange system 130 to rapidly enable the consumption of an ad after a winning bid is selected. In an example, the influence system may execute an AB test by configuring the bid responses according to a split (i.e. 10% of the bid responses will be provided with a control creative, such as a public service announcement, and 90% of the bid responses will be provided with the treatment creative). Once an entity has received an advertising treatment, it is a member of the treatment group, and cannot be a member of the control group for the advertising probe campaign. For an advertising opportunity purchased through an exchange, being a member of a treatment group can mean that a bid response was configured which included the advertising treatment, the advertising exchange system selected the bid response as the winning bid response and the advertising treatment creative was sent to the entity. In some cases, the exposure of the advertising treatment creative to an entity must meet minimum viewability requirements in order for the exposed entity to be considered a member of the treatment group.

In an embodiment, an influence system 100 may operate an advertising probe campaign by selecting a first set of entities which are suitable for the treatment group (e.g. a treatment group entity list) and a second set of entities which are suitable for the control group (e.g. a control group entity list). In some embodiments, a specified entity may be selected as a candidate for either the treatment group or the control group before the opportunity to show an advertisement to the specified entity is available. In some embodiments, a specified entity may be selected as a candidate for either the treatment group or the control group after the opportunity to show an advertisement to the specified entity is available. Advertising opportunities may be acquired through a publisher or network of publishers, bought through an advertising exchange system 140 or combinations thereof. Some care may be taken to reduce bias through careful selection, so that the entities of the treatment group are similar to the entities of the control group in terms of the features, geographic locations and/or demographics of the entities.

Model manager 104 creates, updates and maintains models which are used in the operation of advertising campaigns such as influence models. An influence model for estimating the likelihood that an entity may be influenced by an advertisement can be built based on the features of entities which may be derived from or inferred from histories of entities. A behavioral model, developed by comparing the features of treatment group converters with the features of a control group converters, can be applied to the history of an entity to determine the behavioral similarity of the entity to the set of control group converters compared to the treatment group converters.

Features which are most strongly correlated with the features of the treatment group converters compared to the control group converters can be used to form a model. The features of the treatment group converters are compared to the features of the control group converters, and the distinctive features of the treatment group converters can be identified. In this case, a distinctive feature is a feature which occurs in the treatment group converters with a frequency that is higher or lower than the frequency of the same feature in the control group converters. The resulting behavioral model can be applied to the history of an entity to determine the behavioral similarity of the entity to either the treatment group of converters or the control group converters.

Entities which are similar to the control group converters are unlikely to be influenced towards conversion by an advertisement. The results of applying an influence model to the history of an entity may be used to configure an individual frequency cap for the entity, configure a bid response, select an entity to receive specific advertising content, select a bid price, customize advertising content sent to the entity, select an advertising campaign, customize content sent to the entity or combinations thereof. In an example, if the result of applying an influence model to an entity's history indicates that the entity is similar to control group converters, a low individual frequency cap may be selected for the entity. In some cases, the individual frequency cap may be set to zero, so that the entity does not receive any additional advertising content for the duration of the campaign. In some cases, a hard individual frequency cap may be established. Applying a hard individual frequency cap means that the advertiser explicitly requires that an entity does not receive advertising content after the hard individual frequency cap limit is met; in this case, the advertiser may be concerned that excessive exposure to the advertising content will have a negative effect on a consumer. In some cases, a soft individual frequency cap may be established. Applying a soft individual frequency cap means that an advertiser will not pay the advertising campaign operator for fees associated with advertising content sent to the entity after the entity's soft individual frequency cap is met; in other words, a soft individual frequency cap limits the number of advertising exposures the advertiser may be billed for with respect to each entity.

The scope of an individual frequency cap may be limited to an individual campaign, with only advertising exposures associated with the individual campaign which were sent to a particular entity accruing against the particular entity's individual frequency cap. In this case, an individual frequency cap may be established for each advertising campaign. However, in an example, a particular entity's individual frequency cap may be shared by a set of related campaigns, such as all of the campaigns for a particular advertiser or a subset of an advertiser's campaigns which are closely related; in an example, each advertising exposure sent to a particular entity related to any one of the related campaigns may accrue against the particular entity's individual frequency cap limit. In some cases, every advertising exposure of a particular campaign (or set of related campaigns) may accrue against an entity's individual frequency cap. However, in some examples, the advertising exposure must meet certain criteria in order to accrue against an entity's individual frequency cap. For example, in some cases, an advertising exposure may only accrue against an entity's individual frequency cap if the advertising exposure meets certain viewability requirements (i.e. the advertising content of the advertising exposure must be at least 50% in view for at least 5 seconds).

In an embodiment, the influence system may generate a blacklist of entities which should not be targeted with advertisements for the campaign. For example, if a result of applying an influence model to the features of an entity indicates that the entity is very similar to the control group converters compared to the treatment group converters, an identifier of the entity may be added to a blacklist. In some cases, entities which have already converted and are not expected to convert soon (or ever) may also be added to the blacklist. The blacklist may be sent to the advertiser, sent to other campaign operators who operate campaigns on behalf of the advertiser or both. The blacklist may be used to suppress heavy re-targeting of entities which are likely to convert but unlikely to be further influenced by advertisements, entities which have already converted or both. In some cases, the blacklist may be an attribution blacklist. Credit for a conversion of an entity on an attribution blacklist may be disabled by an advertiser for entities on the attribution blacklist. In some embodiments, an attribution blacklist may record a time stamp in association with an entity's entry on the attribution blacklist; in some cases, attribution for advertising exposures sent to the entity before the entity's blacklist timestamp may still be permitted, while attribution for advertising exposures sent to the entity after the entity's blacklist timestamp may be disabled.

In an example, a whitelist may be used instead of or in addition to a blacklist. In an example, the whitelist may be generated by applying the influence model to the features of entities and selecting entities which are similar to the treatment group converters compared to the control group converters. In an example, a list of entities, such as a list of attractive candidates for a campaign, may be generated and the whitelist may be created by removing blacklisted entities from the list of entities. In an example, the whitelist may be generated by taking a list of entities, such as a list of attractive candidates for a campaign, and removing entities based on the results of applying an influence model to the features of each respective entity; for example, if the results of applying an influence model to an entity's history indicates that the entity is very similar to the control group converters compared to the treatment group converters, an identifier of the entity may be removed from the whitelist.

In some cases, the results of multiple comparative tests may be aggregated based on the similarity of the campaigns. For example, the results of multiple advertising probe campaigns that share one or more features, such as a category of goods or services (i.e. shoes sold online, in-app purchases, music downloads), a common price point (i.e. goods selling for less than five dollars, subscription services selling for between twenty and forty dollars per month), or typical sales funnel length, may be combined together for modeling purposes resulting in a composite influence model. The composite influence model may be applied to an entity's features, such as an entity's consumption history, to determine if the entity is likely to be influenced by an advertisement for a class or category of advertisements, such as advertisements for a category of goods or services, goods or services at a particular price point, goods or services with a common sales funnel length or combinations thereof. The composite influence model may be used in conjunction with a suitable campaign (i.e. a campaign with features in common with the campaigns used to create the composite influence model) and may be used to set an entity's individual frequency cap for a campaign or set of campaigns, select an entity to receive an advertisement, select advertising content, select a campaign, customize advertising content, set a bid price, or combinations thereof. In an example, the results of multiple comparative tests may be aggregated by grouping treatment group converters from multiple advertising probe campaigns into an aggregate group of treatment group converters and grouping control group converters from the same advertising probe campaigns into an aggregate group of control group converters.

Model manager 104 may generate conversion models which can be used to predict the likelihood of conversion. Campaign managers typically look to build on prior success by seeking other people who are like the people who have responded positively to the campaign or the advertised product in the past. An archetypical set of entities, such as a set of converters may be selected (e.g. a set including both the control group converters and the treatment group converters). The archetypical set may comprise a set of entities which have a specific conversion event in their respective histories (such as an online purchase event, a click through at a particular website, or the completion of a registration form). A standard population may be selected or implied. Examples of a standard population are: a population of non-converters, the whole population of internet consumers or a subset of the whole population of internet consumers based on a geographic constraint, a demographic characteristic, or an event in their respective consumption histories. The features of the standard population may be derived from entity histories, bulk data such as census data, or both. By analyzing the features of the archetypical set compared to the features of the standard population, the distinguishing features of the archetypical set may be distinguished from the features of a standard population, such as the whole population of internet consumers, a subset of the whole population of internet consumers based on a geographic constraint, a demographic characteristic, or an event in their respective consumption histories.

Features which are most strongly correlated with the features of the archetypical set compared to the standard population can be used to form a model. For example, the model may be constructed with distinctive features. A distinctive feature is a feature which occurs in the histories of the archetypical set with a frequency that is higher or lower than the frequency of the same feature in the standard audience. In an example, converters for a property insurance campaign may have viewed news stories about Hurricane Sandy with a frequency that is much higher than was seen in the general Internet population; in this case, the feature "viewed news story about Hurricane Sandy" may be selected as a feature of a model constructed for a property insurance campaign. The resulting behavioral model can be applied to the history of an entity to determine the behavioral similarity of the entity to the archetypical set of entities, such as a set of converters.

Campaign Module 106 operates an advertising campaign on behalf of an advertiser. In an example, a conversion model or customer profile is used to select the entities which are most likely to convert for a particular campaign. For example, campaign module 106 may comprise a campaign operations system such as campaign operations system 140. In an example, campaign module 106 receives a stream of bid requests, with each bid request representing an opportunity to expose a specified entity to advertising content. The bid requests which are most suitable for the advertising probe campaign may be selected and the influence system 100 may send a bid response to the advertising exchange system. For example, a conversion model may be applied to features such as features found in the specified entity's history to estimate the likelihood that the specified entity will convert. Campaign module 106 may also apply an influence model, such as an influence model received from the comparative testing module 102, to features of the specified entity. Campaign module 106 may generate a bid response based on the results of applying the influence model. For example, an individual frequency cap for the specified entity may be determined based on the results of applying the influence model to the specified entity's history. The campaign module may generate the bid response in light of the specified entity's individual frequency cap. For example, the campaign module may consult a history of the specified entity to determine if the individual frequency cap of the specified entity has been satisfied, and generate a bid response (or ignore the bid request for the purposes of the campaign) accordingly. In other examples, a result of applying the influence model may be used to determine a bid price, select an advertising creative, select a campaign, customize an advertising creative or combinations thereof.

Figure 2:
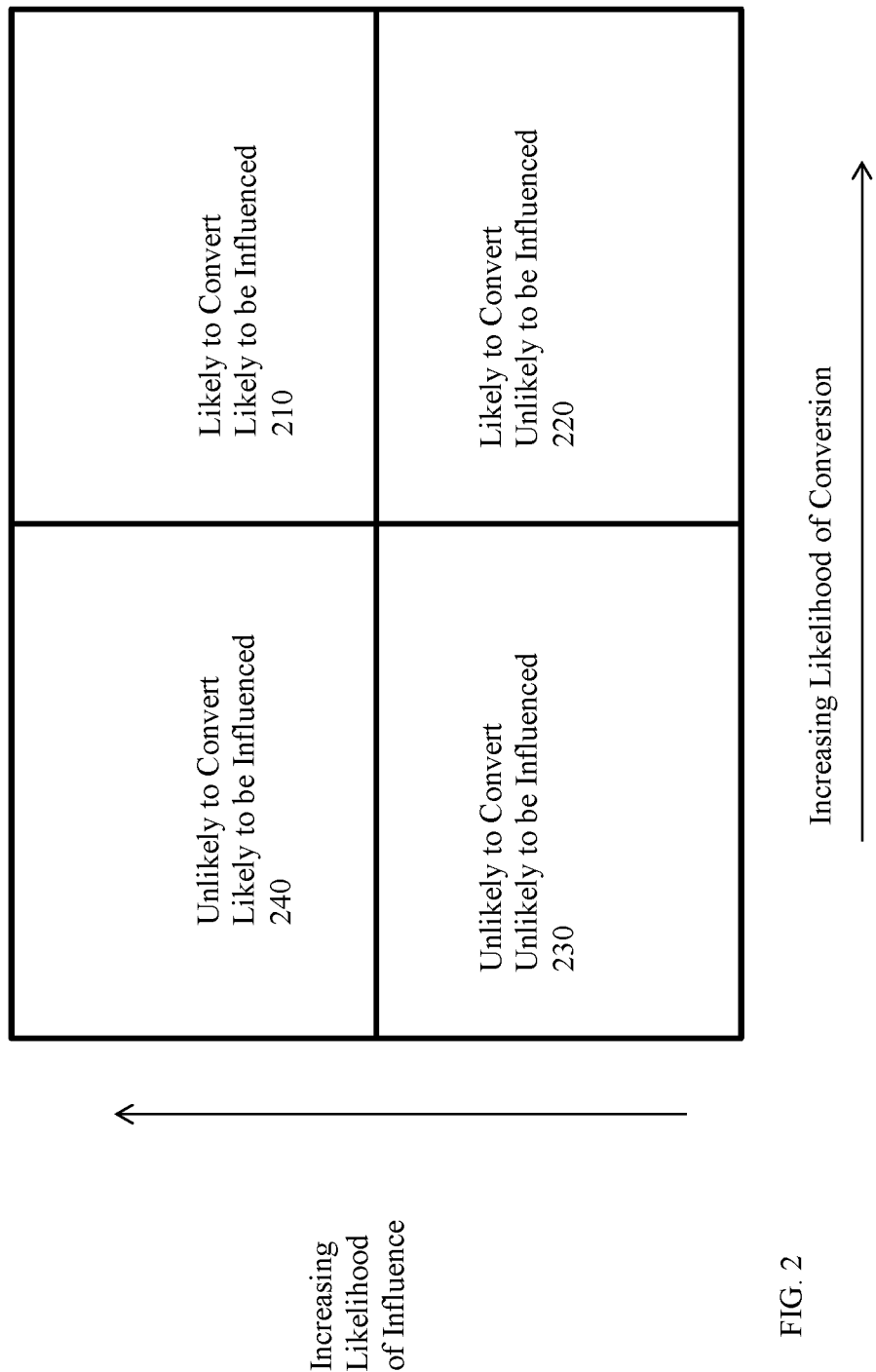
FIG. 2 illustrates a four-class classification scheme which may be used in conjunction with an influence model and a conversion model.

An advertiser may categorize specified entities according to the likelihood that they may be influenced by an advertisement (e.g. according to the results of applying an influence model to a specified entity's features) alone or in conjunction with additional information. FIG. 2 illustrates a four-class classification scheme which may be used in conjunction with an influence model and a conversion model. In an example, a specified entity may be classified according to their likelihood of conversion and the likelihood that the specified entity may be influenced by an advertisement. As previously discussed, the likelihood of conversion may be determined by applying a conversion model to the specified entity's features, such as features of the specified entity's history; the likelihood that the specified entity may be influenced by an advertisement may be determined by applying an influence model to the specified entity's features, such as features of the specified entity's history.

In the example illustrated in FIG. 2, the four categories are: "likely to convert and likely to be influenced" category 210, "likely to convert and unlikely to be influenced" category 220, "unlikely to convert and unlikely to be influenced" category 230 and "unlikely to convert and likely to be influenced" category 240. For example, it is highly desirable to expose specified entities which can be categorized in category 210 to advertisements; as a result, a bid response associated with a specified entity categorized in category 210 may comprise a high bid price. Advertising content selected for an entity of category 210 may comprise an enticement, such as a coupon or discount. An individual frequency cap for an entity of category 210 may be set high compared to less attractive targets of the advertising campaign such as entities categorized in category 230 ("unlikely to convert and unlikely to be influenced"). An entity's category for a campaign may be used to preferentially select or prioritize the campaign.

FIG. 3 is a flow chart illustrating an example of a method 300 of constructing an influence model according to an embodiment.

Referring to Step 310, an advertising probe campaign is operated. In an example, opportunities to expose entities to advertising content may be purchased through a real time bidding exchange (RTB), by arrangement with a publisher or network of publishers or combinations thereof. In an example, a conversion model may be applied to an entity's features to assess the suitability of the entity for the advertising campaign. For example, a conversion model may be applied to an entity's history, such as a media consumption history, to select the entity for the advertising campaign probe, configure a bid response to an exchange (such as an RTB).

Operating an advertising probe campaign comprises executing a comparative test, such as an AB test. To operate a comparative test, some portion of the entities which are suitable for the campaign are sent advertising content (the treatment group) and some portion of the entities which are suitable for the campaign are not sent advertising content (the control group). In some cases, the control group may be sent a public service announcement (PSA), content unrelated to the advertising campaign in place of the advertising content. In some cases, an advertising slot will be purchased, an entity of the control group will not receive advertising content for the purchased slot; for example, an entity of the control group may see a blank spot on their monitor where an ad would normally appear. In other examples, a portion of a presentation which would normally include advertising content may be left blank (e.g. an audio presentation, a presentation embedded in a video game, a video presentation, etc.). The treatment group and the control group are disjoint; there are no entities which are members of both the treatment group and the control group.

The influence system may take steps to reduce bias in the comparative test. For example, some care may be taken to insure that the geographical distribution of the entities of the control group is similar to the geographical distribution of the entities of the treatment group. Other considerations may comprise known or inferred demographics, sociographics, psychographics or combinations thereof.

Referring to Step 320, a set of treatment group converters are selected. Treatment group converters are entities which are members of the treatment group (i.e. they received advertising content) and have met conversion criteria. In some cases, a list of the treatment group converters may be provided to the influence system. In some cases, the influence system may be provided with one or more conversion criteria and the influence system may select the treatment group converters by examining the histories of treatment group entities to determine which treatment group entities are treatment group converters.

Referring to Step 330, a set of control group converters are selected. Control group converters are entities which are members of the control group (i.e. they did not receive advertising content) and have met conversion criteria. In some cases, a list of the control group converters may be provided to the influence system. In some cases, the influence system may be provided with one or more conversion criteria and the influence system may select the control group converters by examining the histories of control group entities to determine which control group entities are control group converters. Control group converters are entities which were not exposed to the advertising content as part of the advertising probe campaign but converted anyways.

Referring to Step 340, an influence model is constructed by comparing features of the treatment group converters to features of the control group converters. The features may comprise any information available to the influence system. In an example, features may be found in or derived from an entity's history, such as, but not limited to a media consumption history. Features of the treatment group converters which occur with a frequency that is higher than or lower than the frequency with which they occur in the control group converters are distinctive features. The influence model may be applied to the features of an entity to estimate the likelihood that the entity will be influenced towards conversion by an advertisement. Advantageously, the influence model may be applied to entities which were not part of the advertising probe campaign.

Referring to Step 350, an advertising campaign is operated. The influence system is notified that an opportunity to expose a specified entity to an advertisement is available. In some cases, the available opportunity may have been pre-purchased from a publisher or publisher network. In some cases, the available opportunity may comprise a bid request sent from an exchange or auction system such as an RTB exchange. The influence system applies the influence model to features of the specified entity to determine the likelihood that the entity will be influenced by an advertisement. In some cases, additional models may be applied, such as a conversion model, to determine the likelihood that the specified entity may convert. In an embodiment, the influence model may be applied after the influence system is notified that the opportunity to expose the specified entity is received.

An individual frequency cap may be determined for the specified entity based on the results of applying the influence model. A time stamp may be associated with the individual frequency cap. In some cases, additional information, such as the results of applying an influence model may be used in the individual frequency cap selection process. For example, an entity which is very likely to be influenced by an advertisement may have a relatively high individual frequency cap, whereas an entity which is unlikely to be influenced by an advertisement may have a very low individual frequency cap, or even an individual frequency cap of zero, which is equivalent to "blacklisting" the specified entity. In some cases, the individual frequency cap may be stored in conjunction with a feature of or an identifier of the specified entity. In some cases, one or more blacklists, whitelists may be generated for a campaign, an advertiser or both. In some cases, a blacklist or whitelist may be sent to an advertiser or an advertiser's partner.

In some embodiments, a list of candidate entities for the campaign may be configured. The influence model may be applied to each candidate entity's history to estimate the likelihood that the candidate entity will be influenced by an advertisement. An individual frequency cap may be configured for each candidate entity and stored in the data repository 109 based at least in part on the results of applying the influence model. In some cases, a time stamp may be associated with each individual frequency cap. The advertising campaign may be operated subject to the configured individual frequency caps. In some cases, the individual frequency caps may be re-evaluated and updated during the operation of the advertising campaign, periodically, according to a schedule, or responsive to receiving additional information relevant to a candidate entity such as an updated history of the candidate entity. In some cases, the individual frequency caps may configured in light of additional information such as, but not limited to, the results of applying a conversion model to the candidate entity's features. One or more blacklists, whitelists or combinations thereof may be configured based on the results of applying the influence model to a candidate entity's features, applying the conversion model to a candidate entity's features or both.

Based on the results of applying the influence model, the entity may be selected for the campaign. In some cases, additional information, such as the results of applying the influence model may be used in the selection process. In an example, an entity which is likely to be influenced by an advertisement may be attractive for the campaign while an entity which is unlikely to be influenced by an advertisement would be less attractive candidate for the campaign.

In an embodiment, a bid price may be set or selected based on the likelihood that the specified entity will be influenced by an advertisement. For example, for an embodiment of the influence system which is integrated with an RTB system, the influence system may receive a bid request associated with an entity which is likely to be influenced by an advertisement and respond by sending a bid response with a high bid price to the RTB. Similarly, the influence system may receive a bid request associated with an entity which is unlikely to be influenced by an advertisement and respond by sending a bid response with a relatively low bid price to the RTB Based on the results of applying the influence model, customized content may be generated for the entity, advertising content may be selected for the entity or both. In some cases, additional information, such as the results of applying the influence model may be used in the content customization or selection process. For example, an entity which is very likely to be influenced by an advertisement may receive selected or customized advertising content which is different from the advertising content selected for or customized for an entity which is less likely to be influenced by an advertisement. For example, an entity which is likely to be influenced by an advertisement may receive advertising content designed to drive a conversion, such as a discount coupon or information about a local sale event whereas an entity which is less likely to be influenced may be provided with advertising content designed to improve brand awareness. In another example, the amount of a discount offered in an advertisement sent to a particular entity may be adjusted based on the likelihood that the particular entity will be influenced by an advertisement. The customized or selected content does not necessarily match the advertising content sent to entities of the treatment group during the comparative test (e.g. the advertising treatment of an advertising probe campaign).

Figure 4:
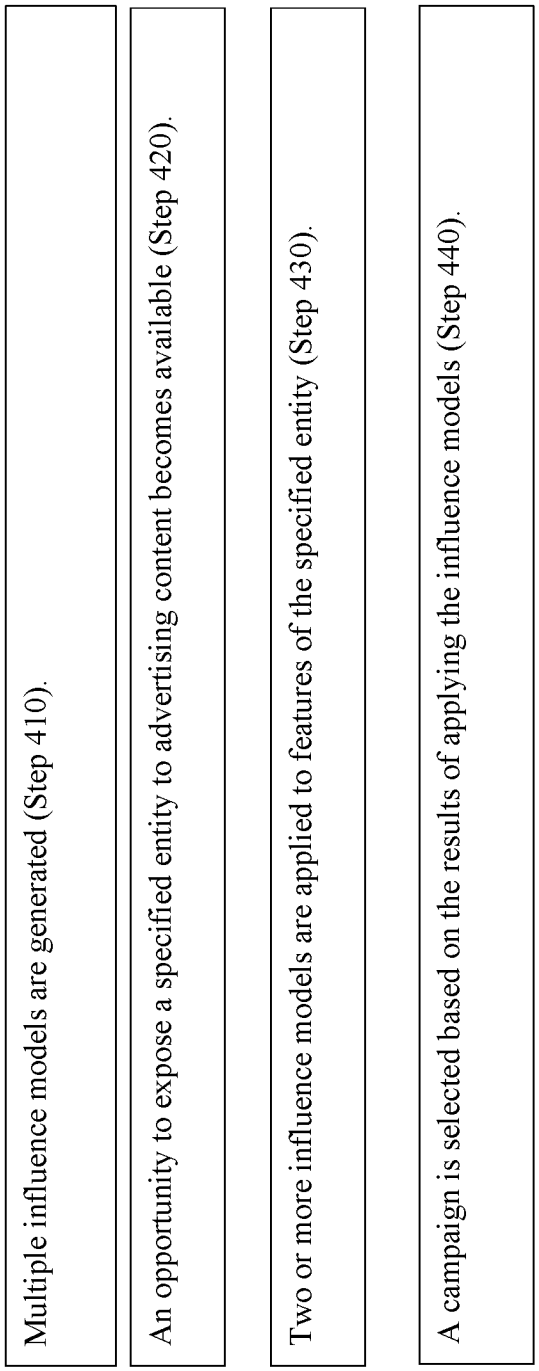
FIG. 4 is a flow chart illustrating an example of a method according to an embodiment.

FIG. 4 is a flow chart illustrating an example of a method according to an embodiment. In an embodiment, an influence system may operate multiple advertising campaigns simultaneously, on behalf of multiple advertisers. There is high demand for high quality advertising opportunities available through advertising exchange systems (such as RTB systems), advertising networks and pre-purchased premium advertising agreements. Because high quality advertising opportunities are a limited resource, the influence system may use the results of applying an influence model to an entity's features to decide which campaign should consume a particular advertising opportunity based on the relative predicted impact of each respective campaign.

Referring to Step 410, multiple influence models are generated. For example, an influence model may be generated for each advertising campaign, for each category of advertising campaign or for each advertiser, as previously described.

Referring to Step 420, an opportunity to expose a specified entity to advertising content becomes available.

Referring to Step 430, two or more influence models are applied to features of the specified entity. Applying a campaign's influence model to the features of a specified entity may result in a score, rating or categorization which indicates the likelihood that the specified entity will be influenced by the campaign's advertising content. The relative potential impact of each campaign on the specified entity can be predicted by comparing the results of applying each campaign's influence model to the features of the same specified entity.

Referring to Step 440, a campaign is selected based on the results of applying the influence models. For example, the influence system may select the campaign with the highest likelihood of influencing the specified entity, and send advertising content of the selected campaign to the specified entity. For an RTB-integrated influence system, a bid response may be configured and sent to the RTB.

Figure 5:
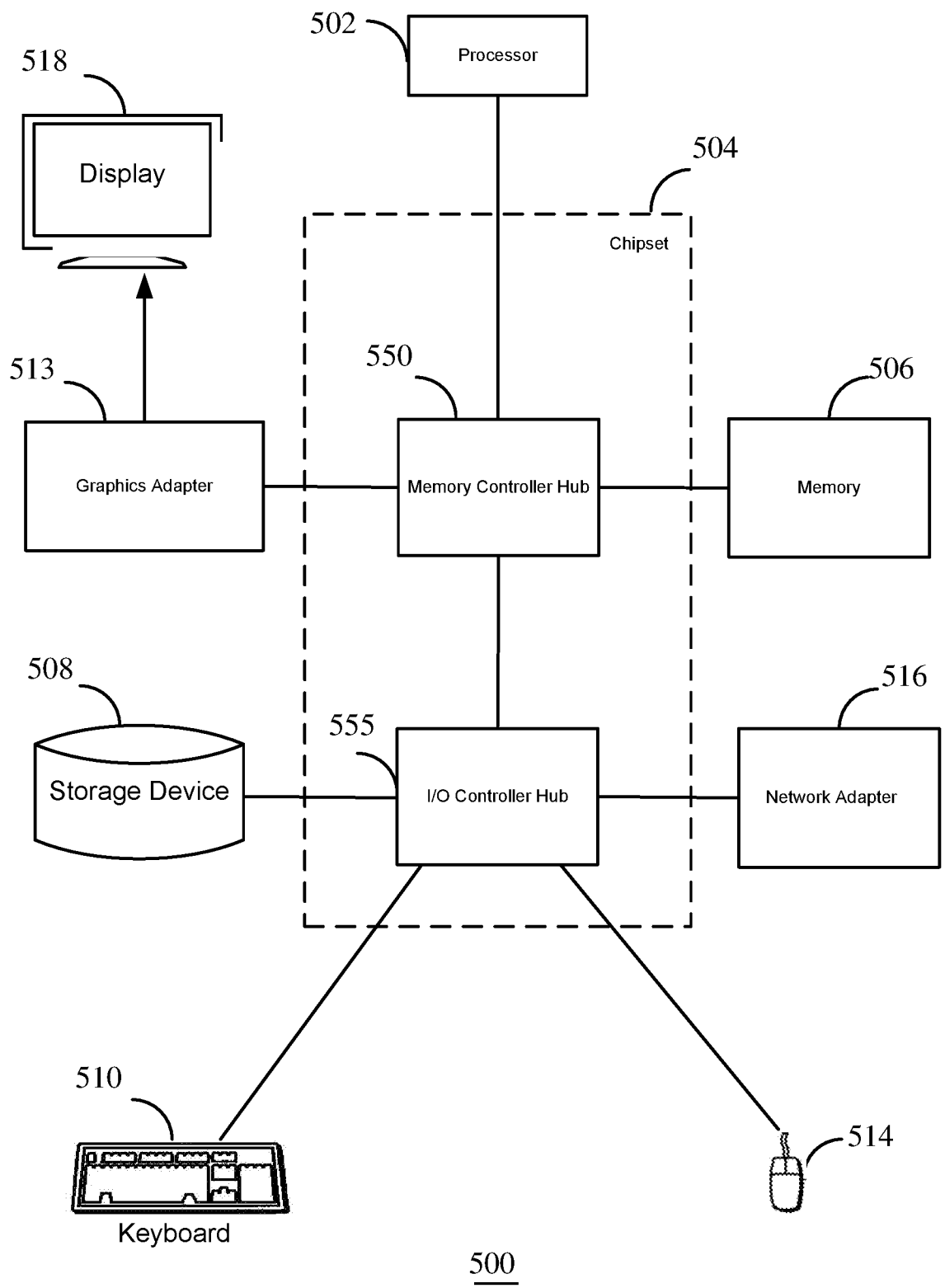
FIG. 5 is a high-level block diagram illustrating an example of a computer for use as an influence system, content provider, entity, advertising exchange system or campaign operations system, in accordance with an embodiment of the invention.

FIG. 5 is a high-level block diagram of a computer 500 for use as the influence system 100, content provider 110, entity 120, advertising exchange system 130 campaign or operations system 140 according to one embodiment. Illustrated are at least one processor 502 coupled to a chipset 504. Also coupled to the chipset 504 are a memory 506, a storage device 508, a keyboard 510, a graphics adapter 513, a pointing device 514, and a network adapter 516. A display 518 is coupled to the graphics adapter 513. In one embodiment, the functionality of the chipset 504 is provided by a memory controller hub 550 and an I/O controller hub 555. In another embodiment, the memory 506 is coupled directly to the processor 502 instead of to the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 150.

As is known in the art, a computer 500 can have different and/or other components than those shown in FIG. 5. In addition, the computer 500 can lack certain illustrated components. In one embodiment, a computer 500 acting as the influence system 100 is formed of multiple spatially and/or time distributed blade computers and lacks a keyboard 510, pointing device 514, graphics adapter 513, and/or display 518. Moreover, the storage device 508 can be local and/or remote from the computer 500.

The computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

The order of the steps in the foregoing described methods of the invention are not intended to limit the invention; the steps may be rearranged.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The described embodiments also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the embodiments disclosed herein without departing from the spirit and scope as defined in the claims.

What is claimed is:

1. A computer-implemented method comprising:
constructing, by an influence system, an influence model for each campaign in a set of two or more campaigns, wherein constructing each influence model comprises:
sending an advertising treatment of a respective campaign over a network to each entity in the respective campaign's treatment group of entities;
selecting the respective campaign's control group of entities, wherein the respective campaign's control group excludes entities of the respective campaign's treatment group and the respective campaign's advertising treatment is not sent to the entities of the respective campaign's control group;

selecting treatment group converters from each respective treatment group of entities, each treatment group converter having met a conversion criterion of its respective campaign after exposure to the respective campaign's advertising treatment;

selecting control group converters from each respective control group of entities, each control group converter having met the conversion criterion of the respective campaign without exposure to the respective campaign's advertising treatment; and comparing features of media consumption histories of the respective campaign's treatment group converters to features of media consumption histories of the respective campaign's control group converters;

receiving, by the influence system and from an auction system, a notification that an opportunity to expose a specified entity to advertising content is available, the specified entity not included in any of the treatment groups;

determining, by the influence system, a frequency cap for each respective campaign from the set of two or more campaigns by applying the constructed influence model for each campaign to features of the specified entity's media consumption history; and sending, from the influence system to the auction system, a response configured according to the determined frequency caps.

2. The method of claim 1 wherein constructing each influence model further comprises:
sending control content over the network to each entity in the respective campaign's control group of entities.

3. The method of claim 2 wherein:
the control content comprises a public service announcement.

4. The method of claim 1 wherein:
the notification comprises a bid request; and
the response to the notification comprises a bid amount determined according to the result of applying.

5. The method of claim 1 further comprising:
adding the specified entity to a respective campaign's blacklist according to the result of applying the respective campaign's constructed influence model to features of the specified entity's media consumption history.

6. The method of claim 1 further comprising:
selecting a campaign from the set of two or more campaigns according to the determined frequency caps; and
customizing advertising content according to the selected campaign's determined frequency cap;
wherein the response is further configured according to the customized advertising content.

7. The method of claim 1 further comprising:
determining a historic exposure to advertising content of each respective campaign from the set of two or more campaigns; and
selecting a campaign from the set of two or more campaigns according to the determined frequency caps and the determined historic exposure;
wherein the response is further configured according to the selected campaign.

8. A nontransitory computer readable storage medium including computer program instructions that, when executed, cause a computer processor to perform operations comprising:

constructing, by an influence system, an influence model for each campaign in a set of two or more campaigns, wherein constructing each influence model comprises:

sending an advertising treatment of a respective campaign over a network to each entity in the respective campaign's treatment group of entities;

selecting the respective campaign's control group of entities, wherein the respective campaign's control group excludes entities of the respective campaign's treatment group and the respective campaign's advertising treatment is not sent to the entities of the respective campaign's control group;

selecting treatment group converters from each respective treatment group of entities, each treatment group converter having met a conversion criterion of its respective campaign after exposure to the respective campaign's advertising treatment;

selecting control group converters from each respective control group of entities, each control group converter having met the conversion criterion of the respective campaign without exposure to the respective campaign's advertising treatment; and comparing features of media consumption histories of the respective campaign's treatment group converters to features of media consumption histories of the respective campaign's control group converters;

receiving, by the influence system and from an auction system, a notification that an opportunity to expose a specified entity to advertising content is available, the specified entity not included in any of the treatment groups;

determining, by the influence system, a frequency cap for each respective campaign from the set of two or more campaigns by applying the constructed influence model for each campaign to features of the specified entity's media consumption history; and sending, from the influence system to the auction system, a response configured according to the determined frequency caps.

9. The nontransitory computer readable storage medium of claim 8 wherein:
the notification comprises a bid request; and
the response to the notification comprises a bid amount determined according to the result of applying.

10. The nontransitory computer readable storage medium of claim 8 further comprising:
selecting a campaign from the set of two or more campaigns according to the determined frequency caps; and
customizing advertising content according to the selected campaign's determined frequency cap;
wherein the response is configured further according to the customized advertising content.

11. The nontransitory computer readable storage medium of claim 8 further comprising:
determining a historic exposure to advertising content of each respective campaign from the set of two or more campaigns; and
selecting a campaign from the set of two or more campaigns according to the determined frequency caps and the determined historic exposure;
wherein the response is further configured according to the selected campaign.

12. The nontransitory computer readable storage medium of claim 8 wherein constructing each influence model further comprises:
sending control content over the network to each entity in the respective campaign's control group of entities.

13. The nontransitory computer readable storage medium of claim 12 wherein:
the control content comprises a public service announcement.

14. A system comprising:
a computer processor; and
a computer readable storage medium storing processor-executable computer program instructions, the computer program instructions comprising instructions for:
constructing, by an influence system, an influence model for each campaign in a set of two or more campaigns, wherein constructing each influence model comprises:
sending an advertising treatment of a respective campaign over a network to each entity in the respective campaign's treatment group of entities;
selecting the respective campaign's control group of entities, wherein the respective campaign's control group excludes entities of the respective campaign's treatment group and the respective campaign's advertising treatment is not sent to the entities of the respective campaign's control group;
selecting treatment group converters from each respective treatment group of entities, each treatment group converter having met a conversion criterion of its respective campaign after exposure to the respective campaign's advertising treatment;
selecting control group converters from each respective control group of entities, each control group converter having met the conversion criterion of the respective campaign without exposure to the respective campaign's advertising treatment; and
comparing features of media consumption histories of the respective campaign's treatment group converters to features of media consumption histories of the respective campaign's control group converters;
receiving, by the influence system and from an auction system, a notification that an opportunity to expose a specified entity to advertising content is available, the specified entity not included in any of the treatment groups;
determining, by the influence system, a frequency cap for each respective campaign from the set of two or more campaigns by applying the constructed influence model for each campaign to features of the specified entity's media consumption history; and
sending, from the influence system to the auction system, a response configured according to the determined frequency caps.

15. The system of claim 14 wherein constructing each influence model further comprises:
sending control content over the network to each entity in the respective campaign's control group of entities.

16. The system of claim 15 wherein:
the control content comprises a public service announcement.

17. The system of claim 14 wherein:
the notification comprises a bid request; and
the response to the notification comprises a bid amount determined according to the result of applying.

18. The system of claim 14 wherein:
applying each influence model to features of the specified entity is responsive to receiving the notification.

19. The system of claim 14 wherein sending advertising content to the specified entity according to the selected frequency caps comprises:
selecting a campaign from the set of two or more campaigns according to the determined frequency caps; and
customizing advertising content according to the selected campaign's determined frequency cap;
wherein the response is further configured according to the customized advertising content.

20. The system of claim 14 further comprising:
determining a historic exposure to advertising content of each respective campaign from the set of two or more campaigns; and
selecting a campaign from the set of two or more campaigns according to the determined frequency caps and the determined historic exposure;
wherein the response is further configured according to the selected campaign.

* * * * *